(12) United States Patent
Takahata et al.

(10) Patent No.: US 9,312,568 B2
(45) Date of Patent: Apr. 12, 2016

(54) LITHIUM SECONDARY BATTERY

(75) Inventors: Koji Takahata, Toyota (JP); Hideki Sano, Daito (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 113 days.

(21) Appl. No.: 14/366,849

(22) PCT Filed: Dec. 21, 2011

(86) PCT No.: PCT/JP2011/079687
§ 371 (c)(1),
(2), (4) Date: Jun. 19, 2014

(87) PCT Pub. No.: WO2013/094037
PCT Pub. Date: Jun. 27, 2013

(65) Prior Publication Data
US 2014/0349189 A1 Nov. 27, 2014

(51) Int. Cl.
*H01M 4/587* (2010.01)
*H01M 10/0583* (2010.01)
*H01M 4/133* (2010.01)
(Continued)

(52) U.S. Cl.
CPC ........... *H01M 10/0583* (2013.01); *B60L 11/18* (2013.01); *H01M 4/133* (2013.01); *H01M 4/366* (2013.01); *H01M 4/587* (2013.01); *H01M 10/0525* (2013.01); *H01M 10/0587* (2013.01);
(Continued)

(58) Field of Classification Search
CPC ... H01M 4/133; H01M 4/1393; H01M 4/587; H01M 4/04; H01M 4/0404; H01M 10/0583; H01M 10/0525

USPC ................................ 429/211, 231.4; 427/598
See application file for complete search history.

(56) References Cited

U.S. PATENT DOCUMENTS

2004/0072076 A1     4/2004  Matsubara et al.
2014/0170487 A1*    6/2014  Takahata ............... H01M 4/133
                                                      429/211

FOREIGN PATENT DOCUMENTS

JP          9-245770         9/1997
JP          2003-197182      7/2003
(Continued)

*Primary Examiner* — Patrick Ryan
*Assistant Examiner* — Kiran Quraishi
(74) *Attorney, Agent, or Firm* — Finnegan, Henderson, Farabow, Garrett & Dunner, LLP

(57) ABSTRACT

A lithium secondary battery 10 of the present invention is a secondary battery provided with a positive electrode 30 having a positive electrode active material layer 34 on a positive electrode collector 32, and a negative electrode 50 having a negative electrode active material layer 54 on a negative electrode collector 52. The positive electrode active material layer 34 contains a positive electrode active material capable of reversibly storing and releasing lithium ions. The negative electrode active material layer 54 contains a negative electrode active material made up of lamellar graphite that is bent so as to have an average number of bends f per particle of $0 < f \leq 3$, and an average aspect ratio of 1.8 or higher. In a cross-section perpendicular to the surface of the negative electrode collector 52, the negative electrode active material is oriented in such a manner that the perpendicularity defined as n2/n1, is 1 or greater, n1 being the number of negative electrode active material units such that $0° \leq \theta_n \leq 30°$, and n2 being the number of negative electrode active material units such that $60° \leq \theta_n \leq 90°$, where $\theta_n$ is the angle formed by a major axis of the negative electrode active material units with respect to the surface of the negative electrode collector 52.

6 Claims, 12 Drawing Sheets

(51) Int. Cl.
  *H01M 4/36* (2006.01)
  *H01M 10/0525* (2010.01)
  *H01M 10/0587* (2010.01)
  *B60L 11/18* (2006.01)
  *H01M 4/02* (2006.01)
(52) U.S. Cl.
  CPC ........ *H01M 2004/027* (2013.01); *Y02E 60/122* (2013.01); *Y02T 10/7011* (2013.01)

(56) References Cited

FOREIGN PATENT DOCUMENTS

| | | | | |
|---|---|---|---|---|
| JP | 2003-197189 | | 7/2003 | |
| JP | 2004-220926 | | 8/2004 | |
| WO | WO2013/018180 | * | 2/2013 | ............ H01M 4/133 |

* cited by examiner

LITHIUM SECONDARY BATTERY

CROSS-REFERENCE TO RELATED APPLICATIONS

This application is a national phase application of International Application No. PCT/JP2011/079687, filed Dec. 21, 2011, the content of which is incorporated herein by reference.

TECHNICAL FIELD

The present invention relates to a lithium secondary battery. More particularly, the present invention relates to a lithium secondary battery provided with a negative electrode in which a negative electrode active material is oriented.

BACKGROUND ART

High energy densities with low weight have been achieved in lithium secondary batteries (typically, lithium ion batteries) in recent years, and hence lithium secondary batteries are growing in importance as high-output power sources for vehicle mounting or power sources for power storage systems. In one typical configuration of this type of lithium secondary battery, the battery has electrodes (positive electrode and negative electrode) in which an electrode active material layer containing an electrode active material is supported on an electrode collector. The electrodes are typically formed by coating the surface of the collector with a paste for forming an electrode active material layer containing an electrode active material, a binder and so forth, drying and subsequent rolling to a predefined density (so-called coating method).

Graphite materials such as natural graphite, synthetic graphite or amorphous carbon from natural graphite or synthetic graphite are widely used as the negative electrode active material contained in such negative electrodes. The graphite material has a layered structure in which planes (referred to as graphene and corresponding to the (002) plane of a graphite crystal structure), made up of carbon six-membered rings, form a stack of a plurality of planes, such that lithium ions become intercalated (stored) between layers of the layered structure and de-intercalated (released) from between the layers, to elicit charge and discharge as a result. Various approaches have been conventionally proposed in order to enhance the performance of negative electrodes in which such graphite material is used as the negative electrode active material.

For instance, Patent document 1 discloses the feature of arranging the direction of the (002) planes of graphite particles in a direction perpendicular to a collector, with a view to enhancing the high-rate discharge characteristic and permeability of an electrolyte solution in a negative electrode, in a case where graphite particles are used as the negative electrode active material.

Patent documents 2 and 3 disclose the feature of producing a negative electrode for lithium secondary batteries by solidification molding of a graphite powder, using a binder material, through removal of a solvent in a state where the (002) planes of graphite particles contained in the graphite powder are oriented in the same direction, in a magnetic field, with a view to increasing discharge capacity and enhancing a cycle characteristic during high-rate charge and discharge.

Patent document 4 discloses the feature of using graphite particles having an average particle size of 10 to 25 m and a specific surface area of 1.0 to 5.0 m²/g, as a negative electrode active material that is oriented in a magnetic field, with a view to enhancing a fast charging characteristic and a high-rate discharge characteristic.

CITATION LIST

Patent Literature

Patent document 1: Japanese Patent Application Publication No. H9-245770
Patent document 2: Japanese Patent Application Publication No. 2003-197189
Patent document 3: Japanese Patent Application Publication No. 2003-197182
Patent document 4: Japanese Patent Application Publication No. 2004-220926

SUMMARY OF INVENTION

Lithium secondary batteries have come to be used in ever more fields of application as the performance of lithium secondary batteries has reached a certain level. Such being the case, the various characteristics demanded from lithium secondary batteries have changed in various ways in accordance with the envisaged applications. For instance, ordinary consumer lithium batteries require an enhanced cycle characteristic. For instance, a demand for enhanced output characteristic and capacity characteristic is placed, in particular, on lithium secondary batteries that are used in, for instance, large equipment and electric automobiles. In particular, for instance, a yet further enhanced high-rate characteristic (large-current discharge characteristic or high-rate discharge characteristic) is required from lithium batteries for applications in hybrid electric automobiles or the like. Such high-rate characteristic is directly affected by the internal resistance of the electrodes. Reducing the internal resistance is accordingly essential in enhancing the high-rate characteristic. How to reduce the internal resistance of electrodes while securing as much capacity as possible has become therefore a major technical issue.

In the light of the above, it is a main object of the present invention to provide a lithium secondary battery in which a high-rate characteristic is further enhanced through a reduction in internal resistance.

The lithium secondary battery according to the present invention is provided with a positive electrode having a positive electrode active material layer on a positive electrode collector, a negative electrode having a negative electrode active material layer on a negative electrode collector, and a nonaqueous electrolyte. The positive electrode active material layer contains a positive electrode active material capable of reversibly storing and releasing lithium ions. In such a configuration, the negative electrode active material contained in the negative electrode active material layer: (1) is made up of lamellar graphite that is bent (or folds) and having an average number of bends f per particle of 0<f≤3; (2) has an average aspect ratio of 1.8 or higher, and (3) is oriented in such a manner that perpendicularity defined as n2/n1 is 1.0 or greater, where n1 is the number of units of the negative electrode active material such that 0°≤θn≤30° and n2 is the number of units of the negative electrode active material such that 60°≤θn≤90°, θn being herein an angle formed by a major axis of the negative electrode active material units with respect to the surface of the negative electrode collector.

In this lithium secondary battery, the lamellar graphite that is the negative electrode active material is oriented in such a manner that perpendicularity is 1 or greater. The lithium secondary battery has thus excellent input-output characteristics, and reduced DC resistance. The lamellar graphite is bent such that the average number of bends f lies in the range $0<f≤3$. Appropriate gaps can be secured thus within the lamellar graphite particles and between adjacent lamellar graphite particles, and diffusion resistance can be accordingly reduced. An average aspect ratio smaller than 1.8, for instance arising through bending of the negative electrode active material as a whole, is undesirable, since this results in poorer DC resistance even if the average number of bends f is satisfied. By virtue of the above configuration, the conductivity of the negative electrode as a whole is enhanced in the direction perpendicular to the collector, and internal resistance is accordingly reduced. This allows realizing as a result a lithium secondary battery having an enhanced polarization characteristic during charge and discharge and boasting a superior high-rate charge and discharge characteristic.

In a preferred embodiment of the lithium secondary battery disclosed herein, the density of the negative electrode active material layer is 1.5 $g/cm^3$ or lower. Reducing internal resistance is essential in order to enhance the high-rate characteristic. In the negative electrode active material layer having the above features, diffusion resistance can be further reduced, and the high-rate characteristic can be effectively enhanced, by setting the density of the negative electrode active material layer to be 1.5 $g/cm^3$ or lower.

In a preferred embodiment of the lithium secondary battery disclosed herein, at least part of the surface of the lamellar graphite is coated with amorphous carbon. In cases where a lamellar graphite material is used as the negative electrode active material, decomposition reactions in an electrolyte solution and generation of gas during charging are known to occur as a result of orienting the edge portions of a graphite multilayer structure towards the positive electrode. By virtue of the above configuration, however, it becomes possible to solve the problems of occurrence of decomposition reactions in an electrolyte solution, and generation of gas, also in a case where the lamellar graphite is oriented so as to take on a perpendicularity of 1 or greater, as described above.

In a preferred embodiment of the lithium secondary battery disclosed herein, the average number of bends f is $0<f≤2$. By having the average number of bends f lie within the above range, it becomes possible to reduce diffusion resistance and to reduce DC resistance, with good balance, and to further increase the high-rate characteristic.

In a preferred embodiment of the lithium secondary battery disclosed herein, the lithium secondary battery is an electric power source for driving of a driving motor in an automobile provided with the motor. The lithium secondary battery is provided as a lithium secondary battery having a superior high-rate characteristic, as described above. Accordingly, the characterizing features of the lithium secondary battery can be fully brought out when used as the electric power source for driving of a motor of an automobile. In particular, the lithium secondary battery is appropriate as a motive power source (typically, motive power source of a hybrid vehicle or electric vehicle) from which a high-rate input-output characteristic is required. The present invention can thus suitably provide a vehicle (for instance, automobile) that comprises the lithium secondary battery disclosed herein.

DESCRIPTION OF EMBODIMENTS

Figure 1:
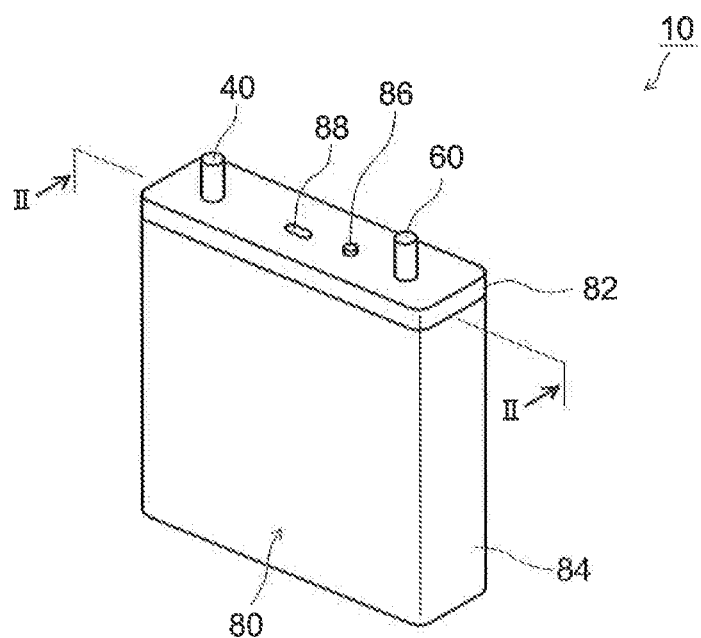
FIG. 1 is a perspective-view diagram illustrating schematically a nonaqueous electrolyte secondary battery according to an embodiment of the present invention.

In the present description, the term "lithium secondary battery" denotes ordinarily a battery that uses lithium ions as charge carriers, and that can be repeatedly changed, and encompasses typically lithium ion batteries, lithium polymer batteries and the like. In the present description, the term "active material" denotes a substance which, in a lithium secondary battery, can reversibly store and release (typically in the form of intercalation and deintercalation) a chemical species (i.e. lithium ions) that constitutes a charge carrier.

The lithium secondary battery provided by the present invention comprises a positive electrode provided with a positive electrode active material layer on a positive electrode collector, a negative electrode provided with a negative electrode active material layer on a negative electrode collector, and a nonaqueous electrolyte, and the lithium secondary battery is characterized by the configuration of the negative electrode. The configuration of such a lithium secondary battery will be explained in due order as follows.

Positive Electrode

The positive electrode is typically prepared by forming a positive electrode active material layer through supply, onto a positive electrode collector, of a paste-like composition for forming a positive electrode active material layer, such that the composition comprises a positive electrode active material, a conductive material and a binder.

A conductive member comprising a metal or resin of good conductivity can be used as the positive electrode collector, in the same way as in electrode collectors for conventional lithium secondary batteries. For instance, a metal having aluminum, nickel, titanium, iron or the like as a main component, or an alloy of such metal can be preferably used herein. Aluminum or an aluminum alloy is more preferred. The shape of the positive electrode collector is not particularly limited, and may conceivably be a shape that conforms, for instance, to the desired shape of the secondary battery. Examples of various forms that can be adopted include, for instance, rod-like, plate-like, sheet-like, foil-like and mesh-like shapes. Typically, an aluminum foil is suitably used herein.

The positive electrode active material layer is formed on the surface of the positive electrode collector. Ordinarily, the positive electrode active material layer has a particulate positive electrode active material as a main constituent, and comprises, alongside the positive electrode active material, also a particulate conductive material for enhancing conductivity, such that the active material and the conductive material are fixed to the positive electrode collector through binding by way of a binder.

A material capable of storing and releasing lithium can be used as the positive electrode active material. Herein there can be used, without particular restrictions, one or two or more types of various positive electrode active materials that are conventionally used in lithium secondary batteries. Lithium transition metal oxides (typically, in particle form) are suitably used as such positive electrode active materials. Typically, there is preferably used one or two or more types of lithium transition metal oxide selected, for instance, from among lithium nickel oxides (typically, $LiNiO_2$), lithium cobalt oxides (typically, $LiCoO_2$), and lithium manganese oxides (typically $LiMn_2O_4$).

Other examples include, for instance, so-called Li-excess ternary system overlithiated transition metal oxides containing three types of transition metal represented by formula:

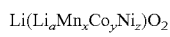

(where a, x, y and z satisfy a+x+y+z=1); or so-called solid solution-type overlithiated transition metal oxides represented by formula

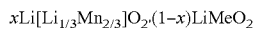

(where Me is one or two or more types of transition metal, and x satisfies 0<x≤1).

Further examples of the positive electrode active material include, for instance, polyanion compounds represented by formula $LiMAO_4$ (where M is a at least one metal element selected from the group consisting of Fe, Co, Ni and Mn, and A is an element selected from the group consisting of P, Si, S and V).

No strict limitations apply to the shape and so forth of the positive electrode active material. Herein, a positive electrode active material prepared as described above may be crushed, granulated and classified by resorting to appropriate means. For instance, a lithium transition metal oxide powder substantially made up of secondary particles having an average particle size ranging from about 1 μm to 25 μm (typically, from about 2 μm to 15 μm) can be preferably used as the positive electrode active material in the technology disclosed herein. A particulate positive electrode active material powder can be obtained as a result that is substantially made up of secondary particles having a desired average particle size and/or particle size distribution.

The substances and so forth of the conductive material are not particularly limited, so long as the conductive material exhibits good conductivity. Herein there can be used, for instance, carbon powder such as various types of carbon black (for example, acetylene black, furnace black, Ketjen black), or graphite powder or the like. The foregoing may be used singly or concomitantly in combinations of two or more types. As a yardstick, the average particle size of the particles (secondary particles) of the carbon material may be set to about 1/500 to 1/20 of the average particle size of the electrode active material. In the production method disclosed herein, the average particle size of the secondary particles of the carbon material is preferably 20 μm or smaller, and ranges more preferably from 200 nm to 10 μm. An average particle size of the secondary particles larger than 20 μm is undesirable, since in that case the particles do not fit readily, in an appropriate manner, in the gaps of the negative electrode active material, and the density of the positive electrode active material of the negative electrode active material layer may drop. In terms of the lower limit of the average particle size of the secondary particles, excessively fine particles are undesirable, since the particles tend to become unevenly distributed towards the top layer portion during the formation of the positive electrode active material layer.

The binder has the function of binding the particles of the positive electrode active material and the conductive material that are contained in the positive electrode active material layer, and of binding the particles with the positive electrode collector. As the binder there can be used a polymer that can dissolve or disperse in the solvent that is used for forming the positive electrode active material layer.

In a case where, for instance, an aqueous solvent is used as the solvent, examples of the aqueous solvent include, among others, a polymer material that dissolves in water (water-soluble polymer material), for instance a cellulosic polymer such as carboxymethyl cellulose (CMC), methyl cellulose (MC), cellulose acetate phthalate (CAP), hydroxypropyl methylcellulose (HPMC) and the like; as well as polyvinyl alcohol (PVA). Examples of polymer materials that disperse in water (water-dispersible polymers) include, for instance, vinyl-based polymers such as polyethylene (PE), polypropylene (PP) and the like; polyethylene oxide (PEO); fluororesins such as polytetrafluoroethylene (PTFE), tetrafluoroethylene-hexafluoropropylene copolymers (FEP), tetrafluoroethylene-perfluoroalkyl vinyl ether copolymers (PFA) and the like; vinyl acetate copolymers; and rubbers such as styrene-butadiene rubber (SBR), acrylic acid-modified SBR resins (SBR latex) and the like.

In a case where a nonaqueous solvent is used as the solvent, preferred solvents that can be used include, for instance, polymers (polyvinylidene fluoride (PVDF), polyvinylidene chloride (PVDC), polyacrylonitrile (PAN) and the like)).

In addition to the function as a binder, the polymer material exemplified herein may be used for the purpose of functioning as an additive, such as a thickener of the paste for forming the positive electrode active material layer (hereafter simply referred to as paste) that is prepared in order to form the positive electrode active material layer.

Both an aqueous solvent and a nonaqueous solvent can be used as the solvent that is utilized for producing the positive electrode. Examples of aqueous solvents include, for instance, compositions that utilize water or a mixed solvent having water as a main constituent (aqueous solvent). As the solvent other than water and that makes up the mixed solvent there can be used one or two or more types of organic solvents (for instance, lower alcohols, lower ketones or the like) that can mix homogeneously with water. Suitable examples of the nonaqueous solvent include, for instance, N-methyl-2-pyrrolidone (NMP).

Although not particularly limited thereto, the conductive material is used, for instance, in an amount ranging from 1 to 20 parts by mass (preferably, 5 to 15 parts by mass) with respect to 100 parts by mass of the positive electrode active material. The binder is used, for example, in an amount of 0.5 to 10 parts by mass with respect to 100 parts by mass of the positive electrode active material.

Negative Electrode

The negative electrode is prepared by forming a negative electrode active material layer through supply, onto a negative electrode collector, of a paste-like composition for forming a negative electrode active material layer, the composition comprising typically a negative electrode active material, a binder and, as the case may require, a conductive material.

A conductive member comprising a metal or resin of good conductivity can be used as the negative electrode collector, in the same way as in negative electrode collectors for conventional lithium secondary batteries. As the negative electrode collector there can be used, for instance, a rod-like body, a plate-like body, a foil-like body or a mesh-like body having copper, nickel, titanium, stainless steel or the like as a main constituent. For instance, a film material or the like resulting from vapor-depositing copper onto a polypropylene film may also be used as the negative electrode collector.

The negative electrode active material layer is formed on the surface of the negative electrode collector. The negative electrode active material layer comprises ordinarily a particulate negative electrode active material as a main constituent, and, as the case may require, a particulate conductive material for enhancing conductivity, the negative electrode active material and the conductive material being fixed to the negative electrode collector through binding by way of a binder.

The negative electrode active material contained in the negative electrode active material layer of the present invention is defined by the characterizing features below. Specifically, (1) the negative electrode active material is made up of bent lamellar graphite having average number of bends f per particle of $0<f\leq3$, (2) and an average aspect ratio of 1.8 or higher, and (3) and is oriented in such a manner that perpendicularity, defined as n2/n1, is 1 or greater, where n1 is the number of units of the negative electrode active material such that $0°\leq\theta n\leq30°$ and n2 is the number of units of the negative electrode active material such that $60°\leq\theta n\leq90°$, $\theta n$ being the angle formed by the major axis of the negative electrode active material units with respect to the surface of the negative electrode collector.

(1) Average Number of Bends f

The average number of bends f is defined as the average value of the number of points of bending equal to or greater than 30° (interior angle up to 150°) per particle of lamellar graphite. Herein, the term bending may encompass a state of distinctive folding along a given line (fold line) of a graphene sheet of the lamellar graphite, as a boundary, such that the planes of graphene sheets form an angle of 30° or more, with the fold line as a boundary, or a state wherein the graphene sheets of the lamellar graphite are curved, although without a clear line (fold line), and the planes of graphene sheets that flank this curved portion form an angle of 30° or more.

The average number of bends f can be ascertained, for instance, through cutting of the negative electrode active material layer along an arbitrary cross-section, and observation of the cut surface for instance by electron microscopy (for instance, by scanning electron microscopy (SEM)). The cut surface in this case is not strictly limited, but is preferably a cross-section that is parallel to the surface of the negative electrode collector. The average number of bends f can be calculated as an average value of 30 or more lamellar graphite particles. The average number of bends f can be calculated on the basis of observation of one cross-section alone, but is preferably calculated on the basis of observation of a plurality of cross-sections.

Figure 4A:
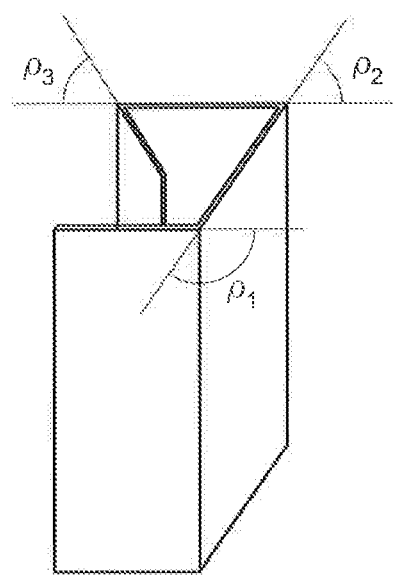
FIG. 4A is a diagram illustrating one bent form of lamellar graphite.
Figure 4B:
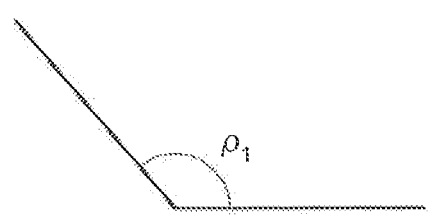
FIG. 4B is a diagram illustrating another bent form of lamellar graphite.
Figure 4C:
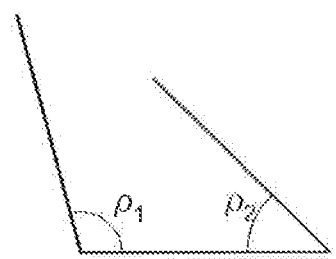
FIG. 4C is a diagram illustrating another bent form of lamellar graphite.
Figure 4D:
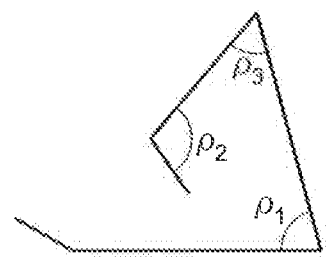
FIG. 4D is a diagram illustrating another bent form of lamellar graphite.

For instance, FIG. 4A is a perspective-view diagram illustrating schematically an example of bending of one lamellar graphite particle. In the example illustrated in FIG. 4A, one lamellar graphite particle has three points at which the particle is bent by 30° or more, specifically, has three points at which an interior angle ρ at the bent portion is 150° or smaller. FIGS. 4B to 4D are transverse cross-sectional diagrams illustrating schematically bending of one lamellar graphite particle. In the example illustrated in FIG. 4B, one lamellar graphite particle has one point at which the particle is bent by 30° or more, i.e. has one point at which the interior angle ρ of the bending portion is 150° or smaller, while in the example illustrated in FIG. 4C the number of bends is two. In the example illustrated in FIG. 4D there is one point where bending is smaller than 30°, but this point is not tallied in the bending count; thus, the number of points of bending by 30° or more per particle of lamellar graphite is three in this case. The number of points of bending by 30° or more for 30 or more particles is worked out in this manner, and the average value thereof yields the average number of bends f.

As a negative electrode active material used in ordinary consumer batteries, graphite adopts the form of spherical (particulate) particles that have been densely made into round particles by mechanical means, mainly with a view to securing capacity. However, the graphene sheets of such spherical particles exhibit numerous disordered bends, which constitute one cause of increased diffusion resistance and increased DC resistance in electrodes. By contrast, the lamellar graphite as the negative electrode active material disclosed herein is bent only to an extent such that the average number of bends flies in the range $0<f\leq3$; accordingly, anisotropy within the lamellar graphite is much smaller, and DC resistance lower, than in the case of conventional spherical particles. On the other hand, wholly unbent lamellar graphite, i.e. flat plate-like lamellar graphite having zero average number of bends f, can be oriented within the negative electrode active material layer during an orientation process; however, many lamellar graphite particles collapse for instance on account of rolling for achieving a predefined density of the negative electrode active material layer, and preserving the orientation becomes difficult. Further, diffusion resistance does not decrease readily, in that the lamellar graphite particles are flat plate-like particles and, accordingly, the lamellar graphite particles become readily densely stacked on each other. In the bent lamellar graphite disclosed herein, however, appropriate gaps can be secured at the interior angle portions that are created through bending. Accordingly, the negative electrode active material layer comprises lamellar graphite that is bent at one point per unit (per particle). The effect of reducing the diffusion resistance in the electrode can be elicited as a result. Accordingly, it is important that the average number of bends f takes on a value larger than zero. An average number of bends f larger than 3 is undesirable, since in this case DC resistance increases unnecessarily. Preferably, the average number of bends f is $0<f\leq2$, for instance $0.1\leq f\leq1.7$, more preferably $0.5\leq f\leq1.5$, and yet more restrictively $0.7\leq f\leq1.3$.

(2) Average Aspect Ratio

The average aspect ratio is defined as the average value, for 30 or more particles, of aspect ratio as given by major axis/minor axis per particle of lamellar graphite. The average aspect ratio can be ascertained, for instance, by cutting the negative electrode active material layer along an arbitrary cross-section, and observing the cut surface for instance by electron microscopy (for instance, SEM). The cut surface in this case is not strictly limited, but is preferably a cross-section that is perpendicular to the surface of the negative electrode collector. The average aspect ratio can be calculated on the basis of observation of one cross-section alone, but is preferably calculated on the basis of observation of a plurality of cross-sections.

Even with the average number of bends f prescribed in (1) being $0<f\leq3$, the lamellar graphite itself thus bent exhibits folding and bending in the longitudinal direction, and thus DC resistance does not drop sufficiently. More preferably, the aspect ratio of lamellar graphite is high, in terms of reducing DC resistance. In the invention disclosed herein, therefore, the average aspect ratio defined as described above is prescribed to be 1.8 or higher.

(3) Perpendicularity

Regarding perpendicularity, θn is the angle formed by the major axis of the negative electrode active material units with respect to the surface of the negative electrode collector. Further, n1 is the number of units of the negative electrode active material such that $0° \leq \theta n \leq 30°$ and n2 is the number of units of the negative electrode active material such that $60° \leq \theta n \leq 90°$. Herein, n1 is the number of graphite particles relatively flat with respect to the negative electrode collector, and n2 is the number of lamellar graphite particles relatively upright with respect to the negative electrode collector. Herein, perpendicularity is defined as n2/n1.

Thus, the perpendicularity of the lamellar graphite is evaluated on the basis of (number of lamellar graphite particles relatively upright with respect to the negative electrode collector)/(number of lamellar graphite particles relatively flat with respect to the negative electrode collector). Accordingly, the perpendicularity of the lamellar graphite may be an index of the degree to which the lamellar graphite is upright, within the negative electrode active material layer, with reference to the negative electrode collector. A perpendicularity of 1.0 indicates that the number of lamellar graphite particles relatively upright with respect to the negative electrode collector is identical to the number of lamellar graphite particles relatively flat with respect to the negative electrode collector. A perpendicularity increasingly larger than 1.0 entails an ever larger proportion of lamellar graphite particles that are upright with respect to the negative electrode collector; and the orientability of the lamellar graphite can be evaluated thus to be high. By contrast, a perpendicularity increasingly smaller than 1.0 entails an ever larger proportion of lamellar graphite particles that are flat with respect to the negative electrode collector, and the orientability of the lamellar graphite can thus be evaluated to be low.

Perpendicularity is preferably large. In the invention disclosed herein, perpendicularity is prescribed to be 1.0 or greater. Preferably, perpendicularity is 1.1 or greater, for instance for instance 1.5 or greater, more preferably 2.0 or greater, and more restrictively, 3.0 or greater.

The features (1) to (3) above can be ascertained for instance through observation of cross-sections of the negative electrode active material layer. For instance, cross-sections are observed using an electron microscope having enough resolution as to allow observing the state of state of lamellar graphite in the negative electrode active material layer. For instance, there may be prepared cross-sectional SEM micrographs in which the cut surface or the like of the negative electrode active material layer is observed. Although not particularly limited, cross-section observation is preferably carried out over a plurality of cross-sections. To work out the average number of bends (1), for instance, more preferably, a cross-section in the planar direction of the negative electrode active material layer (i.e. cross-section parallel to the negative electrode collector) is observed in the vicinity of the center of the thickness of the active material layer. To work out the average aspect ratio (2) and the perpendicularity (3), it is preferable to observe a plurality of cross-sections perpendicular to the negative electrode collector. The plurality of cross-sections perpendicular to the negative electrode collector may be set so as to divide the negative electrode collector evenly over substantially 360°, in a plan view. Cross-sectional SEM micrographs of the plurality of cut surfaces may be prepared thereupon. Cross-sectional SEM images of a plurality of cross-sections are thus prepared. As a result, this allows for more accurate checking and evaluation of the state in which lamellar graphite of a characteristic form is present in the negative electrode active material layer.

Figure 5:
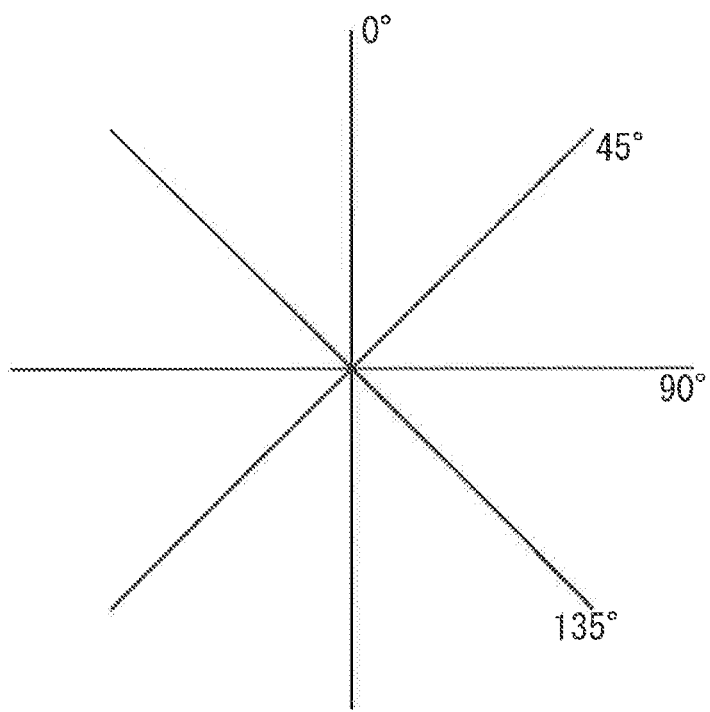
FIG. 5 is a diagram illustrating a distribution of cross-sections to obtain cross-sectional images by electron microscopy.

For the negative electrode active material layer formed in the negative electrode collector, for instance, four cross-sectional SEM micrographs are prepared in cross-sections arbitrarily set at 0°, 45°, 90° and 135°, in a plan view, in the negative electrode collector, as illustrated in FIG. 5. The intersections of the cross-sections coincide with each other in FIG. 5, but this is only for convenience, and the intersections need not match each other. In the example illustrated herein, four cross-sections are disposed at equal intervals of 45°, but, for instance, six cross-sections may conceivably be disposed at equal intervals of about 30°. A plurality of cross-sections may be disposed at substantially equal intervals over the negative electrode collector, in a plan view, and cross-sectional SEM micrographs of the plurality of cross-sections may be accordingly prepared.

Figure 6:
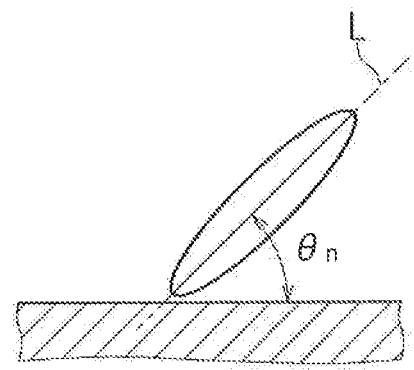
FIG. 6 is a diagram for explaining the determination of perpendicularity in a negative electrode active material according to an embodiment of the present invention.

For instance, a preset number of particulate graphite units are extracted, in the cross-sectional SEM micrographs, from particulate graphite of large apparent cross-sectional area. Various characteristic values are then measured and calculated for the extracted particulate graphite units. To work out perpendicularity (3), for instance a predefined number of particulate graphite units are extracted from lamellar graphite of large apparent cross-sectional area, in cross-sectional SEM images perpendicular to the surface of the negative electrode collector. As illustrated in FIG. 6, the inclination θn of the lamellar graphite with respect to the surface of the negative electrode collector is specified, for instance, on the basis of a straight line L that runs along the longest axis of the extracted lamellar graphite particles. Perpendicularity (n2/n1) is then calculated, where n2 is the number of lamellar graphite particles such that the inclination θn is $60° \leq \theta n \leq 90°$, and n1 is the number of lamellar graphite particles such that the inclination θn is $0° \leq \theta n \leq 30°$.

The excellent high-rate characteristic of lithium ions of the present invention cannot be achieved in the absence of any one of features (1) to (3) as specified above. In terms of enhancing the high-rate characteristic, it is essential that all features (1) to (3) above be satisfied simultaneously.

A graphite material such as natural graphite, synthetic graphite, or amorphous carbon from natural graphite and synthetic graphite can be used as the lamellar graphite above, so long as features (1) to (3) are satisfied. Lamellar graphite wherein at least part of the surface of the foregoing graphite materials is coated with amorphous carbon may be used as the negative electrode active material. Particle size is not particularly limited herein. By way of example, for instance, lamellar graphite is used that has a particle size of about 3 μm or greater, and typically has an average particle size ranging from 5 μm to 20 μm, more typically from about 8 μm to 12 μm. The average particle size denotes herein volume-basis d50 particle size. An average particle size excessively larger than 20 μm is undesirable since in this case the effective capacity of the negative electrode may drop due to, for instance, the time required for diffusion of charge carriers into the interior of the active material. An average particle size excessively larger than 20 μm is likewise undesirable since the process for imparting orientation tends to be more difficult in this case. An average particle size excessively smaller than 5 μm is undesirable since in this case the rates of side reactions at the surface of the negative electrode active material may increase, and the irreversible capacity of the resulting nonaqueous electrolyte secondary battery may increase accordingly.

Preferably, the density of the negative electrode active material layer is 1.5 g/cm$^3$ or lower. Diffusion resistance can be further reduced, in the negative electrode having the above characteristic form, by setting the density of the negative electrode active material layer to be 1.5 g/cm$^3$ or lower. For instance, the density of the negative electrode active material layer ranges preferably from 1.0 to 1.5 g/cm$^3$, more preferably from 1.1 to 1.4 g/cm$^3$, and more restrictively from 1.1 to 1.3 g/cm$^3$. A density of the negative electrode active material layer in excess of 1.5 g/cm$^3$ is preferable in terms of the increased capacity that this entails, but is undesirable in that the degree of packing of the negative electrode active material becomes excessively high, diffusion resistance increases, and the high-rate characteristic is significantly impaired. A density of the negative electrode active material layer lower than 1.0 g/cm$^3$ is undesirable since in that case capacity drops unnecessarily.

Needless to say, such a density of the negative electrode active material layer makes herein no sense, even in a negative electrode active material layer that comprises, as a negative electrode active material, a widely used conventional particulate (spherical) carbon material. The effect of effectively enhancing the high-rate characteristic can be elicited herein only by realizing a density of 1.5 g/cm$^3$ or lower in the negative electrode active material layer having the features prescribed in (1) to (3) above.

To form such a negative electrode active material layer, bent lamellar graphite in which the above average number of bends (1) and average aspect ratio (2) are realized is prepared as the negative electrode active material. The negative electrode active material layer can be formed then by preparing, using the lamellar graphite, a paste-like composition for forming the negative electrode active material layer, supplying then the prepared composition onto a collector, and, thereafter, orienting the lamellar graphite and drying the whole while in that state. The state of the lamellar graphite in the negative electrode active material layer can be controlled on the basis of the viscosity of the paste and the means for orienting the lamellar graphite. Examples of the orienting means include, for instance, application of a magnetic field. The (002) planes of graphite become oriented in a direction perpendicular to the surface of the negative electrode collector through application of a magnetic field in the direction perpendicular to the surface of the negative electrode collector. Specifically, perpendicularity (3) can be realized in that the lamellar graphite is brought to the state of being upright in a direction perpendicular to the surface of the negative electrode collector by virtue of the morphological anisotropy of the bent lamellar graphite. For instance, the above oriented state can be realized through adjustment of, for instance, the intensity of magnetic field that is applied, and of the time during which the magnetic field is applied. The means for orienting the lamellar graphite is not limited to the above one. The lamellar graphite may be oriented in accordance with, for instance, a physical, chemical, electrical or mechanical method, so long as the above perpendicularity can be attained. Drying is performed after orientation of the lamellar graphite, or preferably, while the latter is being subjected to an orienting process. More preferably, the lamellar graphite is for instance dried while under application of a magnetic field.

The various materials that are utilized in the preparation of the composition for forming the positive electrode active material layer described above can be used herein as the binder, solvent, conductive material and so forth that are used to prepare the composition for forming the negative electrode active material layer.

The amount of conductive material can be set to about 1 to 30 parts by mass (preferably, about 2 to 20 parts by mass, for instance about 5 to 10 parts by mass) with respect to 100 parts by mass of the negative electrode active material. The amount of binder with respect to 100 parts by mass of the negative electrode active material can be set, for instance, to 0.5 to 10 parts by mass.

Nonaqueous Electrolyte

One or two or more types of nonaqueous electrolyte used in conventional lithium secondary batteries can be used herein, without particular restrictions, as the nonaqueous electrolyte. The nonaqueous electrolyte may typically contain an electrolyte (specifically, a lithium salt) in an appropriate nonaqueous solvent. The electrolyte concentration is not particularly limited, but there can be used, preferably, a nonaqueous electrolyte solution that contains an electrolyte at a concentration of about 0.1 mol/L to 5 mol/L (preferably, about 0.8 mol/L to 1.5 mol/L). The electrolyte may be a solid-state (gel-like) electrolyte solution in which a polymer has been added to a liquid electrolyte solution.

Examples of the nonaqueous solvent that can be used include, for instance, aprotic solvents such as carbonates, esters, ethers, nitriles, sulfones, lactones and the like. Examples of the foregoing include, for instance, ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyl tetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, γ-butyrolactone and the like.

Examples of the electrolyte include, for instance, $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, $LiClO_4$ and the like.

The electrolyte solution may contain additives, for instance overcharge inhibitors or the like. As an overcharge inhibitor there can be used, without any particular restriction, a compound such that the oxidation potential thereof is equal to or higher than the operating voltage of the lithium secondary battery (for instance, 4.2 V or higher in the case of a lithium secondary battery with full charge at 4.2 V), and such that the compound generates a large amount of gas when oxidized. For instance, an overcharge inhibitor the oxidation reaction potential whereof ranges from 4.6 V to 4.9 V can be preferably used in a lithium secondary battery that is a full-charge state at 4.2 V. Examples of such compounds include, for instance, biphenyl compounds, cycloalkyl benzene compounds, alkyl compounds, organophosphorus compounds, fluorine-substituted aromatic compounds, carbonate compounds, cyclic carbamate compounds, alicyclic hydrocarbons and the like. More specifically, for instance, cyclohexyl benzene (CHB) and cyclohexyl benzene derivatives are preferably used. The amount of overcharge inhibitor with respect to 100 mass % of the electrolyte solution that is used can be set to, for instance, about 0.01 to 10 mass % (preferably, about 0.1 to 5 mass %).

Lithium Secondary Battery

An embodiment of the lithium secondary battery disclosed herein will be explained next with reference to accompanying drawings. A square lithium secondary battery will be explained in this embodiment, but the present invention is not meant to be limited to such an embodiment. Any features other than the features specifically set forth in the present description and which may be necessary for carrying out the present invention (for instance, the configuration and production method of the electrode assembly provided with the positive electrode and the negative electrode, the configuration and production method of the separator and the electrolyte, and ordinary techniques pertaining to the construction of batteries such as lithium secondary batteries and other batteries) can be regarded as instances of design matter for a person skilled in the art on the basis of known techniques in the technical field in question. In the drawings below, members and portions that elicit identical effects are denoted with identical reference numerals, and a recurrent explanation thereof will be omitted or simplified. The dimensional relationships (length, width, thickness and so forth) in the figures do not reflect actual dimensional relationships.

Figure 2:
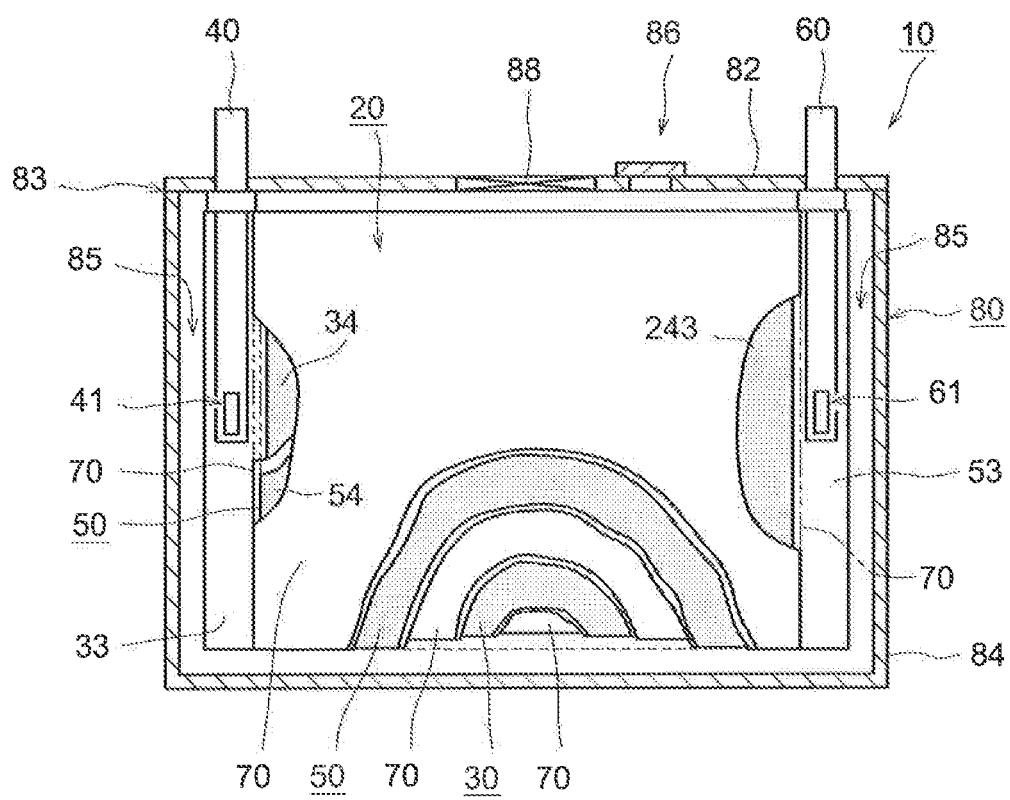
FIG. 2 is a II-II line cross-sectional diagram of FIG. 1.

FIG. 1 is a perspective-view diagram illustrating schematically a square lithium secondary battery according to an embodiment. FIG. 2 is a II-II line cross-sectional diagram of FIG. 1. As illustrated in FIG. 1 and FIG. 2, a lithium secondary battery 10 according to the present embodiment comprises a parallelepiped-shaped square battery case 80 and a lid body 82 that plugs an opening of the case 80. A flat electrode assembly (wound electrode assembly 20) and an electrolyte can be accommodated, through the opening, into the battery case 80. A positive electrode terminal 40 and a negative electrode terminal 60 for external connection are provided in the lid body 82. Part of each terminal 40, 60 protrudes beyond the surface of the lid body 82.

Figure 3:
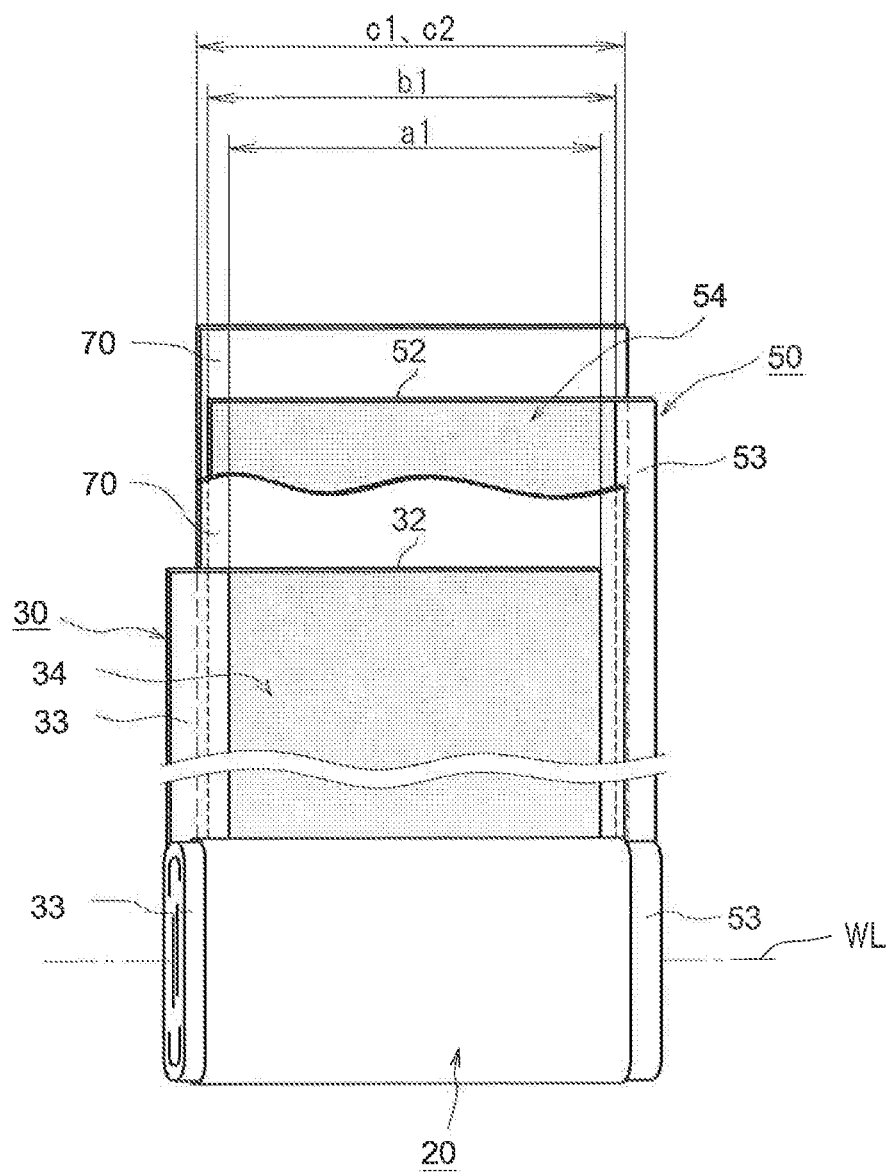
FIG. 3 is a schematic diagram illustrating a wound electrode assembly according to an embodiment of the present invention.

In the present embodiment, as illustrated in FIG. 2, the wound electrode assembly 20 is accommodated inside the battery case 80. FIG. 3 illustrates the configuration of the wound electrode assembly 20. As illustrated in FIG. 2 and FIG. 3, the wound electrode assembly 20 is made up of a positive electrode sheet 30 in which a positive electrode active material layer 34 is formed on the surface of an elongate sheet-like positive electrode collector 32, a negative electrode sheet 50 in which a negative electrode active material layer 54 is formed on the surface of an elongate sheet-like negative electrode collector 52, and elongate sheet-like separators 70.

A portion in which the positive electrode active material layer 34 is not formed and the positive electrode collector 32 is exposed (uncoated section 33) is formed on a first edge section of the wound positive electrode sheet 30, in the longitudinal direction of the latter, a portion in which the negative electrode active material layer 54 is not formed and the negative electrode collector 52 is exposed (uncoated section 53) is formed on a first edge section of the wound negative electrode sheet 50, in the longitudinal direction of the latter. To overlay of the positive electrode sheet 30 and the negative electrode sheet 50 together with two separators 70, both active material layers 34, 54 are stacked, and the electrode sheets 30, 50 are stacked, slightly offset from each other, in such a manner that the uncoated section 33 of the positive electrode sheet 30 and the uncoated section 53 of the negative electrode sheet 50 are disposed protruding beyond the first edge section and the second edge section, respectively, along the longitudinal direction. In this state, the four sheets 30, 70, 50 and 70 are wound about a winding axis WL, and next the resulting wound body is squashed from the sides, to configure the flat wound electrode assembly 20.

Electric connection is elicited by joining the uncoated section 33 of the positive electrode collector 32, by ultrasonic welding, resistance welding or the like, to the positive electrode terminal 40, via the internal positive electrode terminal 41, and similarly joining the uncoated section 53 of the negative electrode collector 52 to the negative electrode terminal 60, by way of the internal negative electrode terminal 61. The resulting wound electrode assembly 20 is accommodated in a case main body 84, with the winding axis WL running transversally, and the lid body 82 is sealed by welding. Thereafter, the electrolyte is poured through an inlet 86 provided in the lid body, and the inlet 86 is sealed, to construct as a result the lithium secondary battery 10 of the present embodiment. The structure, size and material (for instance, metallic, plastic, laminate film or the like) of the battery case 80 are not particularly limited.

Examples of appropriate separator sheets 70 that are used between the positive and negative electrode sheets 30, 50 include a separator sheet made up of a porous polyolefin resin. For instance, a micro-porous sheet made up of a thermoplastic resin (for instance, made of a polyolefin such as polyethylene or polypropylene) can be appropriately used herein. In a case where a solid electrolyte or a gel electrolyte is used as the electrolyte, the separator may in some instances be not necessary (in such cases, specifically, the electrolyte itself can function as a separator).

Figure 7:
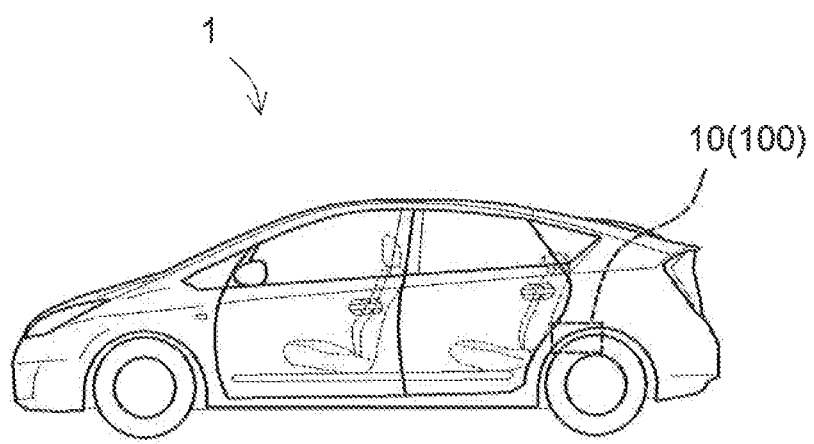
FIG. 7 is a side-view diagram illustrating a vehicle equipped with a lithium secondary battery according to an embodiment of the present invention.

The internal resistance of the lithium secondary battery 10 thus constructed is reduced, as described above, such that the characterizing features of the lithium secondary battery 10 can be brought out through the use of the latter, for instance, as the abovementioned electric power source for driving of a driving motor in an automobile provided with the motor. As illustrated in FIG. 7, for instance, the lithium secondary battery 10 disclosed herein is appropriate as an electric power source for driving of driving motors (typically, an electric power source for driving of a hybrid vehicle), from which a high-rate input-output characteristic is required. The present invention suitably provides a vehicle (for instance, automobile) 1 that comprises the lithium secondary battery 10 disclosed herein (and which may be in the form of an assembled battery 100).

The present invention will be explained in more detail next based on examples, but is not meant to be limited to or by the examples.

Preparation of the Negative Electrode

Graphite materials 1 to 3 of the forms below were obtained through bending of flaky natural graphite coated with an amorphous material.

Graphite material 1: average number of bends 1.2, average aspect ratio 3.5

Graphite material 2: average number of bends 2.7, average aspect ratio 2.0

Graphite material 3: average number of bends 4.4, average aspect ratio 1.6

Negative Electrode Sample 1

Graphite material 1, used as the negative electrode active material, was mixed with 1 part by mass of styrene butadiene rubber (SBR), as a binder, 1 part by mass of carboxymethyl cellulose (CMC), as a thickener, with respect to 100 parts by mass of negative electrode active material and the resulting mixture was dispersed in N-methylpyrrolidone (NMP) as a solvent, to prepare a paste for a negative electrode active material layer.

The resulting paste for forming a negative electrode active material layer was applied onto one face of a Cu foil 5 μm thick, as a collector, to yield a predefined basis weight, and the whole was dried without application of a magnetic field, followed by rolling to a density of 1.2 g/cm$^3$, to produce thereby a negative electrode sheet (negative electrode sample 1).

This negative electrode sample 1 was cut out at a cross-section perpendicular to the surface of the negative electrode collector, and the perpendicularity of the negative electrode active material was assessed on the basis of the cross-section. The result yielded a perpendicularity of 0.5.

Negative Electrode Sample 2

A negative electrode sheet (negative electrode sample 2) was produced in the same way as in negative electrode sample 1, but herein drying was performed while under application of a 0.5 T magnetic field in a direction perpendicular to the surface of the collector.

This negative electrode sample 2 was cut out at a cross-section perpendicular to the surface of the negative electrode collector, and the perpendicularity of the negative electrode active material was assessed on the basis of the cross-section. The result yielded a perpendicularity of 2.3.

Negative Electrode Sample 3

A negative electrode sheet (negative electrode sample 3) was produced in the same way as in negative electrode sample 1, but herein drying was performed while under application of a 0.5 T magnetic field in a direction perpendicular to the surface of the collector, followed by rolling to a density of 1.4 g/cm$^3$.

This negative electrode sample 3 was cut out at a cross-section perpendicular to the surface of the negative electrode collector, and the perpendicularity of the negative electrode active material was assessed on the basis of the cross-section. The result yielded a perpendicularity of 1.3.

Negative Electrode Sample 4

A negative electrode sheet (negative electrode sample 4) was produced in the same way as in negative electrode sample 1, but herein drying was performed while under application of a 0.5 T magnetic field in a direction perpendicular to the surface of the collector, followed by rolling to a density of 1.6 g/cm$^3$.

This negative electrode sample 4 was cut out at a cross-section perpendicular to the surface of the negative electrode collector, and the perpendicularity of the negative electrode active material was assessed on the basis of the cross-section. The result yielded a perpendicularity of 0.2.

Negative Electrode Sample 5

A negative electrode sheet (negative electrode sample 5) was produced in the same way as in negative electrode sample 1, but herein graphite material 2 was used as the negative electrode active material, instead of graphite material 1, and drying was performed while under application of a 0.5 T magnetic field in a direction perpendicular to the surface of the collector.

This negative electrode sample 5 was cut out at a cross-section perpendicular to the surface of the negative electrode collector, and the perpendicularity of the negative electrode active material was assessed on the basis of the cross-section. The result yielded a perpendicularity of 1.8.

Negative Electrode Sample 6

A negative electrode sheet (negative electrode sample 6) was produced in the same way as in negative electrode sample 1, but herein graphite material 2 was used as the negative electrode active material, instead of graphite material 1, and drying was performed while under application of a 0.5 T magnetic field in a direction perpendicular to the surface of the collector, followed by rolling to a density of 1.4 g/cm$^3$.

This negative electrode sample 6 was cut out at a cross-section perpendicular to the surface of the negative electrode collector, and the perpendicularity of the negative electrode active material was assessed on the basis of the cross-section. The result yielded a perpendicularity of 1.1.

Negative Electrode Sample 7

A negative electrode sheet (negative electrode sample 7) was produced in the same way as in negative electrode sample 1, but herein graphite material 2 was used as the negative electrode active material, instead of graphite material 1, and drying was performed while under application of a 0.5 T magnetic field in a direction perpendicular to the surface of the collector, followed by rolling to a density of 1.6 g/cm$^3$.

This negative electrode sample 7 was cut out at a cross-section perpendicular to the surface of the negative electrode collector, and the perpendicularity of the negative electrode active material was assessed on the basis of the cross-section. The result yielded a perpendicularity of 0.5.

Negative Electrode Sample 8

A negative electrode sheet (negative electrode sample 8) was produced in the same way as in negative electrode sample 1, but herein graphite material 3 was used as the negative electrode active material, instead of graphite material 1, and drying was performed while under application of a 0.5 T magnetic field in a direction perpendicular to the surface of the collector, followed by rolling to a density of 1.2 g/cm$^3$.

This negative electrode sample 8 was cut out at a cross-section perpendicular to the surface of the negative electrode collector, and the perpendicularity of the negative electrode active material was assessed on the basis of the cross-section. The result yielded a perpendicularity of 1.2.

Preparation of the Positive Electrode

A paste for a positive electrode was prepared by mixing a lithium transition metal complex oxide (LiNi$_{1/3}$Co$_{1/3}$Mn$_{1/3}$O$_2$), as a positive electrode active material, AB (acetylene black), as a conductive material, PVdF (polyvinylidene fluoride), as binder, to yield a mass ratio of the foregoing materials of 100:5:5, and by mixing the resulting mixture with N-methyl pyrrolidone (NMP), as a solvent. This paste for a positive electrode was applied, to yield a predefined basis weight, onto one face of an Al foil 5 μm thick, as a collector, and the whole was dried, followed by pressing to a total thickness of 100 μm to produce thereby a positive electrode (positive electrode sheet).

Separator

A porous film 20 μm thick having a three-layer structure made up of polypropylene (PP)/polyethylene (PE)/polypropylene (PP) was used herein.

Electrolyte Solution

As the nonaqueous electrolyte solution there was used a nonaqueous electrolyte solution that contained LiPF$_6$, as a supporting salt, in a concentration of about 1 mol/L, in a mixed solvent that contained ethylene carbonate (EC), dimethyl carbonate (DMC) and ethyl methyl carbonate (EMC) in a 3:4:3 volume ratio.

Assembly of a Cell for Evaluation

Laminate cells (lithium ion batteries) for testing were constructed using the positive electrode sheet produced as described above and negative electrode samples 1 to 8. Specifically, respective electrode assemblies were produced by layering the positive electrode sheet (dimensions about 23 mm×23 mm) and a respective negative electrode sheet (dimensions about 25 mm×25 mm), by way of interposed separators, in such a manner that the active material layers of the electrode sheets opposed each other.

Each electrode assembly was accommodated, together with a nonaqueous electrolyte solution, in a bag-like battery container made of laminate, and the container was sealed, to construct thereby cell (lithium ion battery) samples for evaluation 1 to 8.

10-Second Output (25° C.)

The 10-second output (25° C.) was worked out in accordance with the procedures below. In the present embodiment, the measurement temperature environment was set to normal temperature (herein, 25° C.).

Procedure 1: to adjust SOC, the cell is brought to SOC 60% through charging at 1 C constant current, for instance charging at constant voltage at SOC 60% for 2.5 hours, and pausing for 10 seconds.

Figure 9:
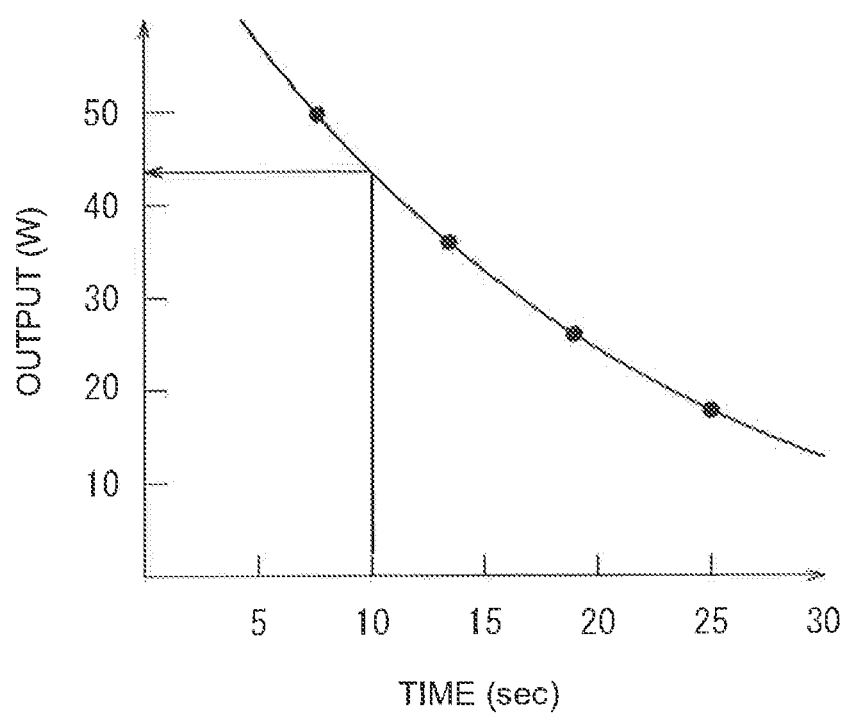
FIG. 9 is a diagram illustrating the relationship between amount of power in constant wattage discharge and the time required to reach a predefined cut voltage during such constant wattage discharge.

Procedure 2: after procedure 1, the cell is discharged, from SOC 60%, at constant wattage (W) (constant output). In constant wattage discharge, discharge takes place at same amount of power per unit time, by increasing the flow of current as the voltage drops through discharge. The number of seconds that it takes for voltage to drop down to a predefined cut voltage upon discharge from the SOC 60% state is measured herein.

axis of the graph of FIG. 9 is worked out, as the 10-second output, on the basis of this approximate curve.

Table 1 sets out, as "10-second output comparison (%)", the results of the 10-second output worked out in the cell samples for evaluation 1 to 8, taking as 100% the 10-second output value of sample 1. The higher the numerical value in samples 1 to 8, the higher is the high-rate output characteristic of the respective battery.

TABLE 1

| | Negative electrode active material layer | | | | |
| --- | --- | --- | --- | --- | --- |
| | Negative electrode active material | | | | |
| Sample | Average number of bends | Average aspect ratio | Density (g/cm³) | Perpendicularity | 10-second output (%) |
| 1 | 1.2 | 3.5 | 1.2 | 0.5 | 100 |
| 2 | 1.2 | 3.5 | 1.2 | 2.3 | 132 |
| 3 | | | 1.4 | 1.3 | 115 |
| 4 | | | 1.6 | 0.2 | 92 |
| 5 | 2.7 | 2 | 1.2 | 1.8 | 118 |
| 6 | | | 1.4 | 1.1 | 109 |
| 7 | | | 1.6 | 0.5 | 95 |
| 8 | 4.4 | 1.6 | 1.2 | 1.2 | 104 |

Figure 8:
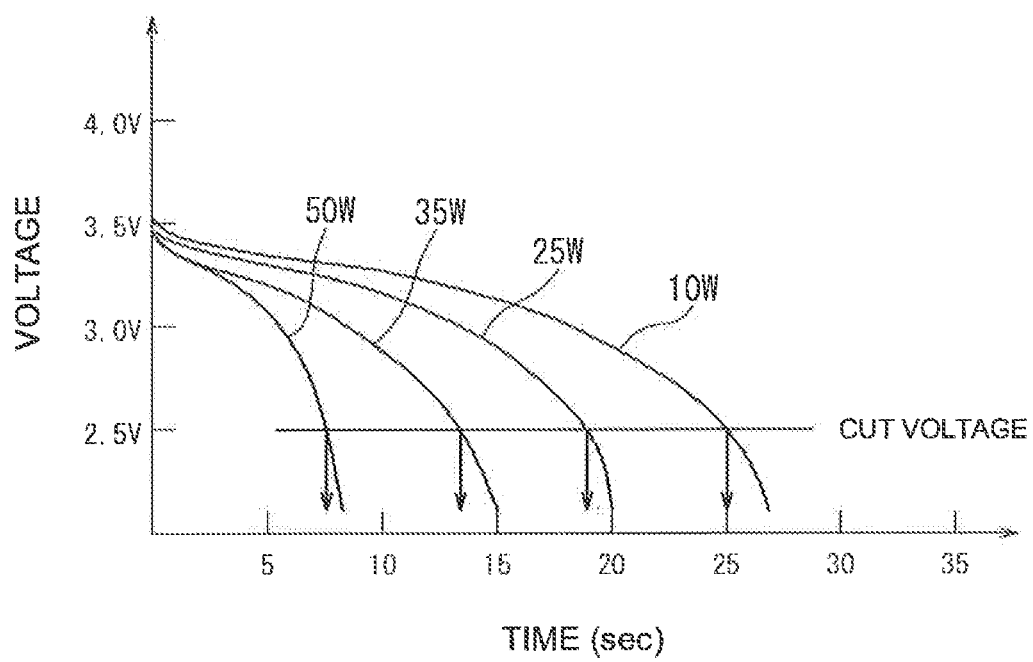
FIG. 8 is a diagram illustrating the relationship between voltage drop and time in constant wattage discharge.

Procedure 3: procedure 1 and procedure 2 are repeated while the condition of constant wattage discharge in procedure 2 is varied within a range of 5 W to 50 W in procedure 2 (see FIG. 8). The abscissa axis represents the number of seconds up to the respective measured predefined cut voltage, and the ordinate axis represents the condition of power (W) in constant wattage discharge per unit time. The output W (10-second output) that yields a predefined cut voltage over 10 seconds of constant wattage discharge, from SOC 60%, is calculated based on the approximate curve.

The output characteristic at high rate can be grasped on the basis of the "10-second output (25° C.)".

More specifically, FIG. 8 illustrates a relationship, for 10-second output (25° C.), between voltage drop and time in constant wattage discharge according to procedure 2.

As illustrated in FIG. 8, for instance, constant wattage discharge is performed, from a state of SOC 60%, at a predefined power established within a range from 5 W to 50 W. FIG. 8 illustrates typical examples of the relationship between voltage drop and time (seconds) for respective instances of power of 10 W, 25 W, 35 W, 50 W in constant wattage discharge. Herein, 2.5 V is set as the predefined cut voltage. As illustrated in FIG. 8, the time (seconds) elapsed until voltage drops down to the cut voltage is measured for each discharge output (W) of constant wattage discharge, on the basis of the relationship between time (seconds) and voltage drop at a respective constant wattage discharge for 10 W, 25 W, 35 W and 50 W.

FIG. 9 illustrates an approximate curve and a method for calculating the 10-second output in procedure 3. To construct the approximate curve illustrated in FIG. 9, a graph is prepared where time (seconds) is set on the abscissa axis, and output (W) is set on the ordinate axis. In this graph there are plotted the discharge output (W) of constant wattage discharge, as worked out based on FIG. 8, and the time (seconds) that it takes for voltage to drop down to the cut voltage. The approximate curve is drawn with respect to the plots. The discharge output at the position of 10 seconds in the abscissa In sample 1 to sample 4, graphite material 1, having itself a low average number of bends of 1.2 and a high average aspect ratio of 3.5, is used as the negative electrode active material. As Table 1 shows, the perpendicularity of the negative electrode active material (sample 1) having undergone no orientation of the negative electrode active material in a magnetic field, and being rolled to yield and density of the negative electrode active material layer of 1.2 g/cm³, was 0.5.

In sample 2 to sample 4, by contrast, the negative electrode active material was oriented in a magnetic field. A comparison between sample 1 and sample 2 revealed that graphite material 1 affords significantly enhanced perpendicularity and output characteristic by being oriented in a magnetic field.

Graphite material 2 of the characterizing form disclosed herein, namely a average number of bends of 2.7 and an average aspect ratio of 2, is used as the negative electrode active material of sample 5 to sample 7. The negative electrode active material is rolled such that the density of the active material layer is identical to those of sample 2 to sample 4. A comparison between sample 1 and sample 3 revealed that graphite material 2 as well affords significantly enhanced perpendicularity and output characteristic by being oriented in a magnetic field.

Graphite material 3, having a large average number of bends, of 4.4, and accordingly a small average aspect ratio, of 1.6, is used as the negative electrode active material in sample 8. A comparison between sample 2, sample 5 and sample 8 revealed that a good graphite material, as the negative electrode active material in the negative electrode active material layer, has an average number of bends of 3 or fewer and an average aspect ratio of 1.8 or higher.

A comparison between sample 2 to sample 4 and sample 5 to sample 7 reveals that both perpendicularity and output characteristic are impaired through excessive rolling aimed at increasing the density of the negative electrode active material layer. Specifically, it is found that the density of the negative electrode active material is preferably 1.5 g/cm³ or lower.

Table 1 reveals that the high-rate output characteristic is further improved in a case where the negative electrode active material of the negative electrode active material layer has an average number of bends of 1.5 or fewer, an average aspect ratio of 1.8 or higher, and a density of 1.5 g/cm³ or lower.

The present invention has been explained on the basis of preferred embodiments thereof, but the above disclosure is not limiting, and needless to say, may accommodate various modifications.

INDUSTRIAL APPLICABILITY

Any one of the lithium secondary batteries disclosed herein can exhibit properties, in particular excellent input-output characteristics, that render the lithium secondary battery suitable as a power source or the like in a battery installed in a vehicle, or in a power storage system. Therefore, the present invention affords a vehicle 1 provided with any one of the lithium ion batteries 10 disclosed herein (which may be in the form of an assembled battery 100 resulting from connecting a plurality of lithium ion batteries 10), for instance as illustrated in FIG. 7. In particular, there is provided a vehicle, (for instance, automobile) that is equipped with the lithium ion battery 10 as a motive power source (typically, motive power source of a hybrid vehicle, plug-in vehicle, fuel cell vehicle or electric vehicle).

REFERENCE SIGNS LIST 1 vehicle
10 lithium secondary battery
20 wound electrode assembly
30 positive electrode sheet (positive electrode)
32 positive electrode collector
33 uncoated section
34 positive electrode active material layer
38 binder
40 positive electrode terminal
41 internal positive electrode terminal
50 negative electrode sheet (negative electrode)
52 negative electrode collector
53 uncoated section
54 negative electrode active material layer
60 negative electrode terminal
61 internal negative electrode terminal
70 separator
80 battery case
82 lid body
84 case main body
86 injection hole
100 assembled battery
WL winding axis

The invention claimed is:

1. A lithium secondary battery, comprising:
a positive electrode having a positive electrode active material layer on a positive electrode collector,
the positive electrode active material layer containing a positive electrode active material capable of reversibly storing and releasing lithium ions; and
a negative electrode having a negative electrode active material layer on a negative electrode collector,
the negative electrode active material layer containing a negative electrode active material,
the negative electrode active material being made up of bent lamellar graphite having an average number of bends f per particle of $0<f\leq3$ and having an average aspect ratio of 1.8 or higher, and
the negative electrode active material being oriented in such a manner that perpendicularity defined as n2/n1 is 1.0 or greater,
n1 being the number of units of the negative electrode active material such that $0°\leq\theta n\leq30°$,
n2 being the number of units of the negative electrode active material such that $60°\leq\theta n\leq90°$, and
where $\theta n$ is an angle formed by a major axis of the negative electrode active material units with respect to the surface of the negative electrode collector.

2. The lithium secondary battery according to claim 1, wherein the density of the negative electrode active material layer is 1.5 g/cm³ or lower.

3. The lithium secondary battery according to claim 1, wherein at least part of the surface of the lamellar graphite is coated with amorphous carbon.

4. The lithium secondary battery according to claim 1, wherein the average number of bends f is $0<f\leq2$.

5. The lithium secondary battery according to claim 1, wherein the lithium secondary battery is an electric power source for driving of a driving motor in an automobile provided with the motor.

6. A vehicle, comprising the lithium secondary battery according to claim 5.

* * * * *